(12) United States Patent
Christenson

(10) Patent No.: US 6,332,568 B1
(45) Date of Patent: Dec. 25, 2001

(54) WAFER SCALE MICROMACHINE ASSEMBLY METHOD

(75) Inventor: Todd R. Christenson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/761,359

(22) Filed: Jan. 16, 2001

Related U.S. Application Data

(60) Provisional application No. 60/176,188, filed on Jan. 14, 2000.

(51) Int. Cl.[7] .............................. B23K 20/24; B23K 1/20; B23K 31/02
(52) U.S. Cl. ...................... 228/193; 228/180.1; 228/194; 228/205
(58) Field of Search .................................... 228/193, 194, 228/195, 179.1, 180.1, 205, 206, 245, 254

(56) References Cited

U.S. PATENT DOCUMENTS

| | | | |
|---|---|---|---|
| 3,657,801 | * | 4/1972 | Hershenson . |
| 4,624,404 | * | 11/1986 | Ohmae et al. . |
| 4,763,828 | * | 8/1988 | Fukaya et al. . |
| 5,440,805 | * | 8/1995 | Daigle et al. . |
| 5,442,144 | * | 8/1995 | Chen et al. . |
| 5,763,941 | * | 6/1998 | Fjelstad . |
| 5,988,488 | * | 11/1999 | Slattery et al. . |
| 6,192,596 | * | 2/2001 | Bennett et al. . |
| 6,272,159 | * | 8/2001 | Garcia . |

OTHER PUBLICATIONS

WO 94/17551 Williams et al. (Aug. 4, 1994).*
US 2001–0001989 A1 Smith (May 31, 2001).*

* cited by examiner

*Primary Examiner*—Tom Dunn
*Assistant Examiner*—Kiley Stoner
(74) *Attorney, Agent, or Firm*—Brian W. Dodson

(57) ABSTRACT

A method for fusing together, using diffusion bonding, micromachine subassemblies which are separately fabricated is described. A first and second micromachine subassembly are fabricated on a first and second substrate, respectively. The substrates are positioned so that the upper surfaces of the two micromachine subassemblies face each other and are aligned so that the desired assembly results from their fusion. The upper surfaces are then brought into contact, and the assembly is subjected to conditions suited to the desired diffusion bonding.

15 Claims, 2 Drawing Sheets

1b)

WAFER SCALE MICROMACHINE ASSEMBLY METHOD

BENEFIT OF PROVISIONAL APPLICATION

This application claims the benefit of Provisional Application No. 60/176,188, filed Jan. 14, 2000.

FEDERALLY FUNDED RESEARCH

This invention was made with Government support under Contract DE-AC04-94AL85000 awarded by the U.S. Department of Energy. The Government has certain rights in the invention.

BACKGROUND

This invention relates to methods of forming micromachines and components. More particularly, it relates to a fabrication process wherein micromachine subassemblies on separate substrates are diffusion bonded together to form a united structure.

Micromachines are potentially useful for a wide range of applications requiring robust and complex miniature mechanisms, and particularly for forming an interface between complex microelectronic circuitry and the external world. Many such applications, however, require many discrete levels of components, some of which components are thick compared to the average component thickness, to provide the required functionality. Multiple component levels and thick components, however, are difficult to fabricate based solely on the planar microfabrication techniques known in silicon microelectronics and in such metallic-based fabrication techniques as LIGA (LIGA is a German acronym which stands for lithography, electroplating, and molding). Even when high-aspect-ratio fabrication techniques are used, maintenance of precise intercomponent separations and tolerances is often difficult. In addition, even though suitable techniques exist to planarize the surface of a micromachine subassembly, so that further growth and component definition can take place, problems and costs associated with such serial microfabrication dramatically limit the use of these techniques.

There is therefore a need for a method to enable assembly of micromachine subassemblies which require multi-level precision structures. A further need is for a method which can be used to assemble such micromachines in batches, preferably on the scale of entire substrate wafers. Application of such techniques to packaging of micromachines will also be useful to the industry.

SUMMARY OF THE INVENTION

A method for assembling a pair of micromachine subassemblies, each initially fabricated on its own substrate, and each having a planar upper mating surface. At least one of the substrates also has a release layer located between the substrate proper and the micromachine subassembly. The substrates are oriented so that their upper mating surfaces face each other, and then are pressed together in proper relative orientation. The conditions of temperature, pressure, and time under which the pressing is done are such as to result in diffusion bonding of the upper mating surfaces. After this diffusion bonding step, the release layer is removed, thereby yielding a micromachine assembly atop one of the substrates.

BRIEF DESCRIPTION OF THE DRAWINGS

FIG. 1a shows a pair of micromachine subassemblies on separate substrates.

FIG. 1b shows the micromachine subassemblies as they appear during the diffusion bonding step.

FIG. 1c shows the micromachine assembly after being released from one of the substrates.

FIG. 2a shows a pair of micromachine subassemblies on separate substrates. The upper mating surfaces of the subassemblies belong to a diffusion bonding layer which facilitates the diffusion bonding process.

FIG. 2b shows the micromachine subassemblies as they appear during the diffusion bonding step.

FIG. 2c shows the micromachine assembly after being released from one of the substrates.

DETAILED DESCRIPTION OF THE INVENTION

The instant invention is a group of related methods which serve to assemble two micromachine subassemblies atop each other using diffusion bonding to bond the structures of the two subassemblies together. Specific implementations will be discussed to teach working principles of the invention, but are not intended to limit the scope of the invention to those implementations presented. Rather, the scope of the invention is intended to be set by the claims interpreted in view of the specification.

Figure 1:
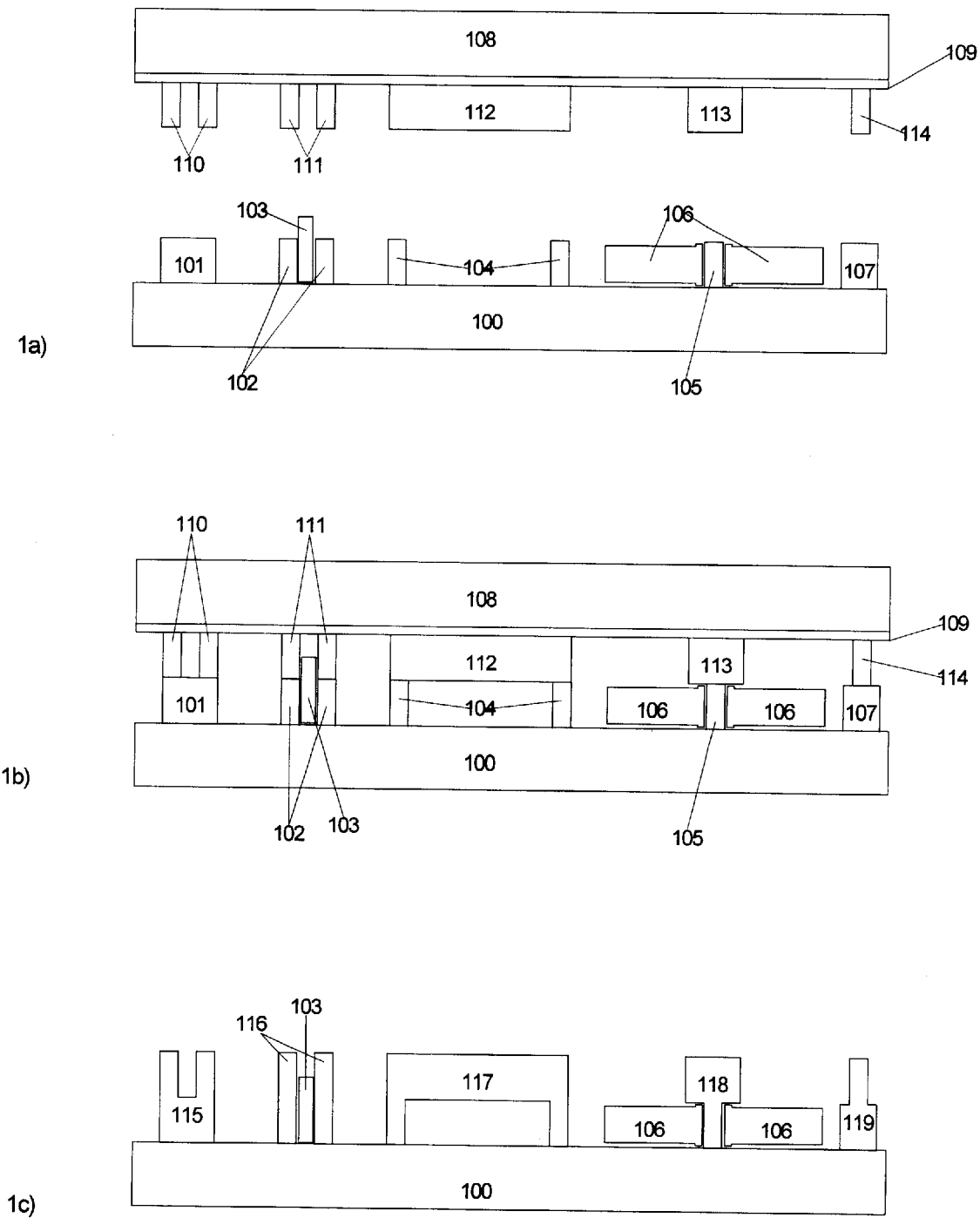
FIG. 1 shows, in schematic form, structures produced while carrying out a specific implementation of the invention.

The first implementation to be presented appears in FIG. 1. A first micromachine subassembly is fabricated atop first substrate 100. The first micromachine subassembly comprises components 101–107. A second micromachine subassembly is fabricated atop release layer 109, which is grown atop second substrate 108. The second micromachine subassembly comprises components 110–114.

The micromachine subassemblies can be prepared using any suitable technique or combination of techniques. These would include such diverse fabrication approaches as LIGA (an acronym for the German for lithography, electroplating, and molding), deep x-ray lithography, silicon surface micromachining and lithography, electric discharge machining, and direct laser additive fabrication. Substrate can be made of any suitable material, semiconductor, metallic, or ceramic substrates being particularly suitable. The subassembly components are typically made of silicon, polysilicon, or nickel alloys, but can include semiconductors, metals, ceramics, and combinations of these materials.

A release layer 109 is formed atop substrate 108, and the second micromachine subassembly is formed atop release layer 109. The release layer must be compatible with the materials of substrate 108, the materials of the second micromachine subassembly, and the conditions under which the diffusion bonding is carried out. This requires that the various materials have similar coefficient of expansion, exhibit good adhesion, do not melt or significantly deform under the diffusion bonding conditions, and similar considerations which are well-known in the art.

Removal of the release layer without damaging the functionality of the assembled micromachine subassemblies must also be possible. Removal is typically accomplished using wet chemical or plasma etching techniques. Examples would include use of a silicon oxide release layer between a silicon substrate and polysilicon micromachine components, and use of a copper release layer between an alumina substrate and nickel micromachine components. The silicon oxide release layer can be removed using a hydrofluoric acid etchant, and the copper release layer can be removed using an acid treatment.

FIG. 1a shows a variety of micromachine components which have been fabricated atop first substrate 100, and also atop release layer 109. Pillar 101 is to form a base for alignment guide 110, which has the form of a hollow cylinder. Alignment mount 102 also has the form of a hollow cylinder, within which guide rod 103 is press fitted. Guide rod 103 slides within alignment guide 111 when the two subassemblies are fitted together, thereby insuring that the mutual alignment and orientation is correct. We have found that alignment of the two subassemblies of better than one micron when assembled can be obtained using such alignment guides.

Disk mount 104 is a larger hollow cylinder, to which disk 112 will be attached in the assembly process. Axle 105 forms an axle for wheel 106, which can be fabricated in place, or fabricated separately, and then inserted onto axle 105. Wheel 106 will then be held in place by attaching axle cap 113. Finally an axle on a higher level is formed by bonding axle mount 107 to shaft 114.

A small number of specific component types are illustrated in this example. However, there are a huge range of micromechanical components available for use in such subassemblies. Use of specific components to illustrate aspects of the instant invention should not be read as limiting the scope of the invention to subassemblies comprising those specific components.

We also point out that the simple structures of FIG. 1 can be duplicated a large number of times over the surface of a substrate, so that many micromachine assemblies can be bonded in a single operation. This capacity for wafer-scale assembly is an important practical aspect of the instant invention.

The upper surfaces (meaning the surfaces farthest from the supporting substrate) of the various components forms the planar mating surfaces of their respective micromachine subassemblies. Usually, however, the initial fabrication process will not produce mating surfaces which are sufficiently flat for reliable diffusion bonding, which requires intimate contact of the surfaces to be bonded.

Accordingly, to produce planar mating surfaces it is usually necessary to apply a fabrication technique suited to producing a sufficiently flat surface. Such techniques include, but are not limited to, diamond lapping and chemical-mechanical polishing. Such techniques and their application are well-known in the art.

FIG. 1b shows the two substrates and their respective micromechanical subassemblies positioned as they are during the diffusion bonding process. The strength of the diffusion bond can, in some cases, be improved by cleaning foreign materials, in particular oxide layers, from the planar mating surfaces before pressing them together. Such cleaning is not a necessary part of the instant invention, but at times will result in a superior product.

Techniques suited for such cleaning are generally known in the art, and often include removing foreign materials with an oxygen plasma, or other means of exposure to oxygen, followed by etching away the resulting oxygen layer. For example, a nickel surface can be cleaned by exposure to an oxygen plasma followed by an ammonium hydroxide treatment to remove the nickel oxide layer which results.

Diffusion bonding conditions are well known for a wide range of materials, and are accessible to one skilled in the art. For the specific case of electrodeposited nickel mating surfaces, it is beneficial to place the surfaces in a high vacuum (order of $10^{-6}$ Torr), and then to backfill with argon prior to carrying out diffusion bonding. Suitable conditions for the diffusion bonding process are temperatures near 500° C. and pressures in the 10–100 megapascal region. These conditions, in the case of these electrodeposited nickel mating surfaces, must be maintained for a period typically of several hours to obtain a robust diffusion bond. Typical diffusion bond shear strengths in this case are similar to the yield strength of the nickel material.

FIG. 1c shows the assembled micromachine components after the release layer has been removed and the second substrate removed. Pillar 101 and alignment guide 110 have been bonded to form raised alignment guide 115, which can serve to guide the addition of an additional micromechanical subassembly. Alignment mount 102 and alignment guide 111 have been bonded to form alignment channel 116, which is filled by guide rod 103.

Disk mount 104 and disk 112 have bonded to form raised disk 117. Note that a structure similar to 117 can be used to package other micromechanical components.

Axle 105 and axle cap 113 have bonded to form axle assembly 118, around which wheel 106 can still rotate. Axle mount 107 and shaft 114 have bonded to form raised axle 119.

Figure 2:
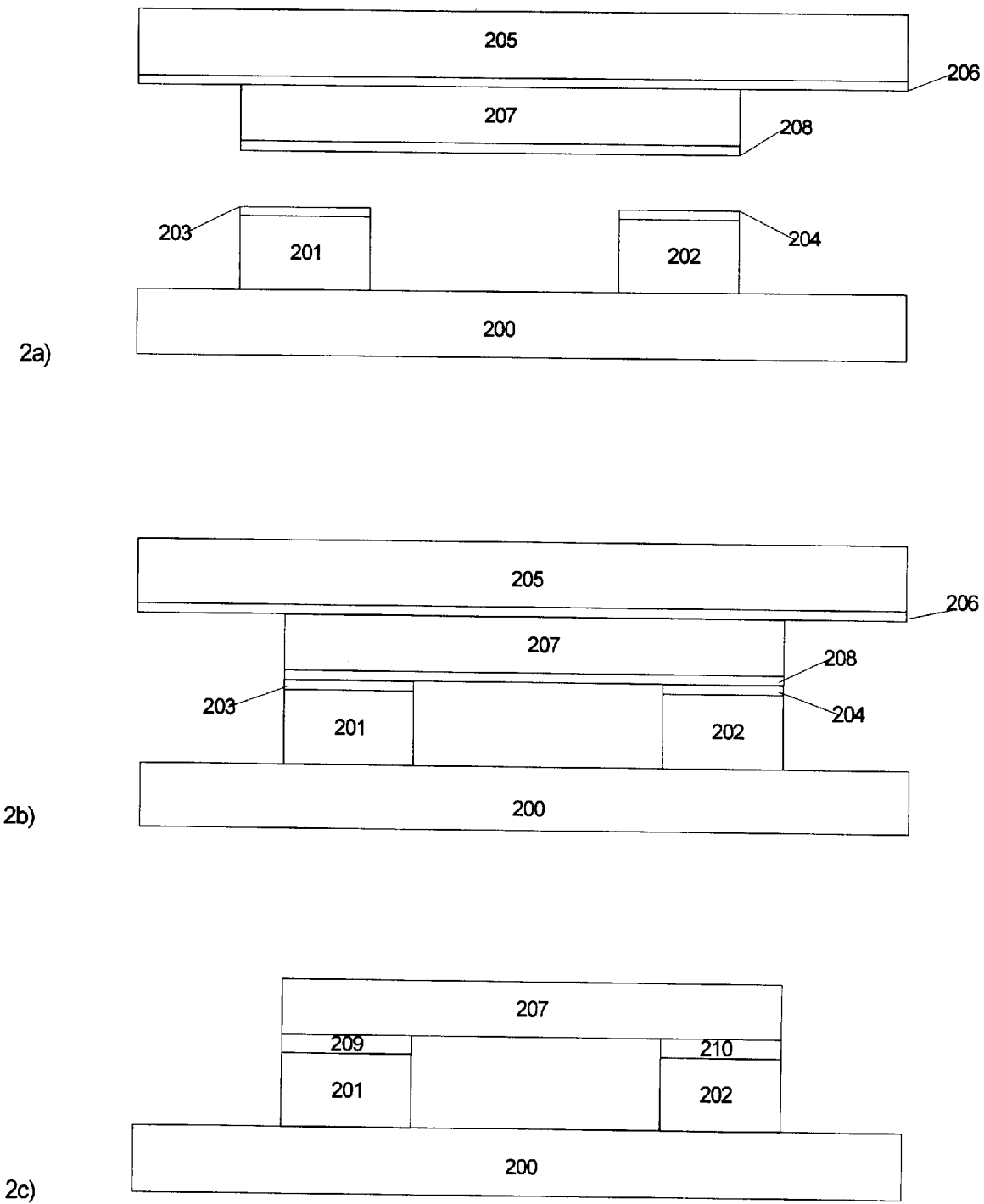
FIG. 2 shows, in schematic form, structures produced while carrying out a second implementation of the invention.

An additional implementation of the instant invention is shown in FIG. 2. FIG. 2a shows first substrate 200, on which are fabricated support pillars 201 and 202, on top of which are formed bonding layers 203 and 204. The bonding layers are often lapped or polished to form planar mating surfaces.

On top of second substrate 205 is formed release layer 206, on top of which is formed plate 207. On plate 207 is formed bonding layer 208, which again is often lapped or polished to form planar mating surfaces. Note that if the material of the bonding layers is sufficiently soft, material deformation at the interface can allow adequate diffusion bonding for many purposes.

FIG. 2b shows the substrates and subassemblies in position for diffusion bonding. As in the earlier implementation, cleaning of the mating surfaces prior to pressing them together can be beneficial.

FIG. 2c shows the assembled micromachine after diffusion bonding and after the release layer and second substrate are removed. Bonding layers 203, 204, and 207 have merged in the diffusion bonding process to form bonding pads 209 and 210.

What is claimed is:

1. A method for fabricating a composite micromachine from micromachine subassemblies, comprising:
    a) forming a first micromachine subassembly on a first substrate, the first micromachine subassembly having a planar mating surface;
    b) forming a second micromachine subassembly on a release layer situated atop a second substrate, the second micromachine subassembly having a planar mating surface;
    c) positioning the first and second substrates so that their planar mating surfaces are facing each other;
    d) aligning the first and second substrates so that the first and second micromachine subassemblies are oriented as desired to form a composite micromachine therefrom;
    e) pressing the two mating surfaces together under conditions suited for diffusion bonding of the two micromachine subassemblies; and, f) removing the release layer, thereby exposing a released surface of the second micromachine subassembly.

2. The method of claim 1, wherein the planar mating surfaces of the first and second micromachine subassemblies are metallic.

3. The method of claim 1, wherein the planar mating surfaces of the first and second micromachine subassemblies comprise nickel.

4. The method of claim 3, wherein the step of pressing the two mating surfaces together is carried out with a pressure less than about 100 megapascals and at a temperature sufficient to cause diffusion bonding but less than about 600° C.

5. The method of claim 1, wherein the planar mating surfaces of the first and second micromachine subassemblies consist essentially of nickel.

6. The method of claim 1, wherein the release layer comprises copper.

7. The method of claim 1, wherein the release layer consists essentially of copper.

8. The method of claim 1, further comprising cleaning the planar mating surfaces of the first and second micromachine subassemblies prior to the step of pressing the two planar mating surfaces together.

9. The method of claim 7, wherein the step of cleaning the planar mating surfaces comprises application of a plasma to said surfaces.

10. The method of claim 8, wherein the plasma comprises oxygen.

11. The method of claim 1, wherein at least one of the planar mating surfaces has a composition which differs from the remainder of the corresponding micromachine subassembly, the composition of the planar mating surface being chosen for the purpose of facilitating the diffusion bonding process.

12. The method of claim 10, wherein facilitating the diffusion bonding process prevents the diffusion bonding of moving components within the first or second micromachine subassemblies.

13. The method of claim 1, wherein the composite micromachine comprises a packaging structure formed during the diffusion bonding of the first and second micromachine subassemblies.

14. The method of claim 1, wherein the step of forming the first micromachine substructure comprises forming a first set of alignment structures, the step of forming the second micromachine substructure comprises forming a corresponding second set of alignment structures, and the step of pressing the two mating surfaces together comprises positioning the first set of alignment structures with the corresponding second set of alignment structures.

15. The method of claim 1, further comprising:
a) forming a third micromachine subassembly on a second release layer situated atop a third substrate, the third micromachine subassembly having a planar mating surface;
b) positioning the third substrate so that the released surface of the second micromachine subassembly and the planar mating surface of the third substrate are facing each other;
c) aligning the third substrate so that the released surface of the second micromachine subassembly and the third micromachine subassembly are oriented as desired to form a composite micromachine therefrom;
d) pressing the released surface of the second micromachine subassembly and the planar mating surface of the third micromachine subassembly together under conditions suited for diffusion bonding of the two micromachine subassemblies; and,
e) removing the second release layer, thereby exposing a released surface of the third micromachine subassembly.

* * * * *